(12) United States Patent
Lemke et al.

(10) Patent No.: US 9,088,543 B2
(45) Date of Patent: Jul. 21, 2015

(54) COORDINATED NETWORK SECURITY MANAGEMENT

(71) Applicant: International Business Machines Corporation, Armonk, NY (US)

(72) Inventors: William A. Lemke, Scarsdale, NY (US); Neil I. Readshaw, Gold Coast (AU)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 13/908,161

(22) Filed: Jun. 3, 2013

(65) Prior Publication Data

US 2014/0359693 A1 Dec. 4, 2014

(51) Int. Cl.
*G06F 11/30* (2006.01)
*H04L 29/06* (2006.01)

(52) U.S. Cl.
CPC .................................. *H04L 63/0263* (2013.01)

(58) Field of Classification Search
CPC ............ H04L 41/0893; G06F 11/0781; G06F 11/3072
USPC .............................................. 726/1–4, 27–30
See application file for complete search history.

(56) References Cited

U.S. PATENT DOCUMENTS

| | | | |
|---|---|---|---|
| 7,318,237 B2 | 1/2008 | Moriconi et al. | |
| 7,516,475 B1 | 4/2009 | Chen et al. | |
| 7,966,655 B2 * | 6/2011 | Acharya et al. | 726/11 |
| 8,429,255 B1 * | 4/2013 | Khan et al. | 709/221 |
| 2005/0283823 A1 | 12/2005 | Okajo et al. | |
| 2006/0010491 A1 * | 1/2006 | Prigent et al. | 726/11 |
| 2006/0129670 A1 * | 6/2006 | Mayer | 709/223 |
| 2009/0300748 A1 * | 12/2009 | Diehl et al. | 726/11 |

FOREIGN PATENT DOCUMENTS

| | | |
|---|---|---|
| EP | 1746764 A2 | 1/2007 |
| WO | 0069120 A1 | 11/2000 |

OTHER PUBLICATIONS

Check Point Software Technologies Ltd., "Endpoint Policy Management | Check Point Software" Copyright 2012 Check Point Software Technologies Ltd., retrieved on Sep. 17, 2012, retrieved from the Internet <http://www.checkpoint.com/products/endpoint-policy-management/index.html>.

Siemens AG et al., "An Integrated Identity Management Mechanism for Network Management Systems and Managed Networks", an IP.com Prior Art Database Technical Disclosure, Original Publication Date: Apr. 25, 2006, IP.com number: IPCOM000134733D, IP.com Electronic Publication: Mar. 17, 2006, Copyright: Siemens AG 2006.

* cited by examiner

*Primary Examiner* — Josnel Jeudy

(74) *Attorney, Agent, or Firm* — Edward Li

(57) ABSTRACT

A computer-implemented method, computer program product, and computer system for implementing coordinated management of network security controls. The computer system determines a plurality of managed network devices affected by coordinated security policies in a network. The computer system converts the coordinated security policies to firewall rule configuration for each of the managed network devices affected. The computer system adds the firewall rule configuration to a set of firewall rules for the each of the managed network devices affected.

12 Claims, 4 Drawing Sheets

US 9,088,543 B2

COORDINATED NETWORK SECURITY MANAGEMENT

FIELD OF THE INVENTION

The present invention relates generally to network security, and more particularly to a system and method of coordinated management of network security controls.

BACKGROUND

According to industry recognized best practices, securing the communications within complex IT environments, either traditional IT or cloud, requires a defense-in-depth approach that involves the configuration of host (server or workstation) based firewalls, network firewalls, virtual private network (VPN) router based firewalls, hypervisor based firewalls, and router/switch access control lists (ACLs).

Currently, the security elements are managed independently in multiple respects. Different administrative tools may be required to manage network security policy across firewalls, routers, and others alike. Enabling a new service on a server may require changes to multiple network security policies to allow end-to-end access. For example, enabling a new web service may require a host and one or more network firewall changes which are performed consistently and at the same time. The current approach causes a great deal of overhead labor with regard to the management of appropriate and inappropriate network access. Additionally, server operating system firewalls and workstation operating system firewalls are not commonly used as security controls due to the fact that there is a high level of management overhead.

BRIEF SUMMARY

Embodiments of the present invention provide a computer-implemented method, computer program product, and computer system for implementing coordinated management of network security controls. In a network, the computer system determines a plurality of managed network devices affected by a set of coordinated security policies. The computer system converts the set of the coordinated security policies to firewall rule configuration for each of the plurality of the managed network devices. The computer system adds the firewall rule configuration to a set of firewall rules for each of the plurality of the managed network devices.

DETAILED DESCRIPTION

Figure 1:
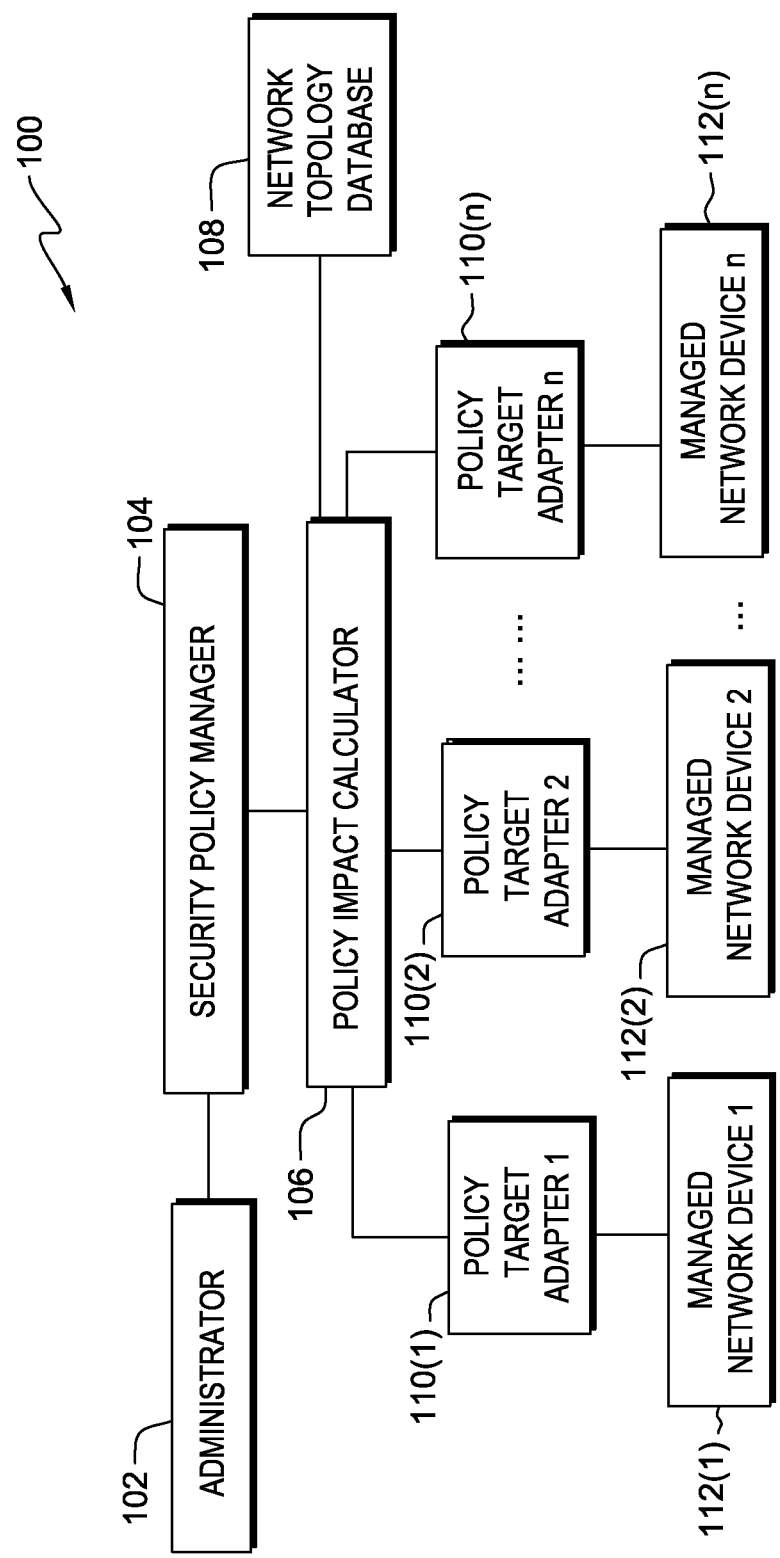
FIG. 1 is a diagram illustrating an exemplary system for implementing coordinated network security management, in accordance with an exemplary embodiment of the present invention.

FIG. 1 is a diagram illustrating system 100 for implementing coordinated network security management, in accordance with an exemplary embodiment of the present invention. System 100 comprises security policy manager 104, policy impact calculator 106, network topology database 108, policy target adapters 110(1), 110(2), ..., and 110(n), and managed network devices 112(1), 112(2), ..., and 112(n). Security policy manager 104, policy impact calculator 106, network topology database 108, policy target adapters 110(1), 110(2), ..., and 110(n) are components of firewall management server 250 shown in FIG. 2. In accordance with an exemplary embodiment of the present invention, firewall management server 250 is hosted by a computing device which is described in later paragraphs with reference to FIG. 4.

Managed network devices 112(1), 112(2), ..., and 112(n) are points of network security policy enforcement and a respective one of the managed network devices requires a documented, supported policy administration interface with which a respective one of policy target adapters 110(1), 110(2), ..., and 110(n) interacts. In an exemplary infrastructure shown in FIG. 2, managed network devices 112(1), 112(2), ..., and 112(n) are, for example, virtual private network (VPN) router 251, traditional network firewall 252, hypervisor based firewall 253, server based firewall 254, router/switch access control lists (ACLs) 255, and workstation based firewall 256.

Security policy manager 104 is accessible to system administrator 102. System administrator 102 accesses security policy manager 104 to view and manage network security policies. The network security policies outline rules for computer network access, determine how policies are enforced, and lay out some of the basic architecture of the company security/network security environment. Security policy manager 104 may be accessed through a web interface or from a thick client application. An example of security policy manager 104 is IBM Security SiteProtector™.

Network topology database 108 contains a representation of a network and computing systems connected by the network. In the exemplary embodiment, network topology database 108 stores network information of managed network devices 112(1), 112(2), ..., and 112(n). The network information on network topology database 108 is used by policy impact calculator 106 to calculate impact of points of network security policy enforcement on flows in the network, for example flows among components (cloud based infrastructure as a service 220, IaaS management network 230, and customer premise 210) in infrastructure 200 shown in FIG. 2. Existing network traversal algorithms in the art are used to calculate the impact.

Policy impact calculator 106 determines a set of coordinated security policies to be propagated to managed network devices 112(1), 112(2), ..., and 112(n). To do so, policy impact calculator 106 combines knowledge from network topology database 108 and security policies defined on security policy manager 104. Policy impact calculator 106 calculates the impact of the set of the coordinated security policies on each managed network device (such as managed network devices 112(1), 112(2), ..., and 112(n)) of each route to a service. The service, for example, is at least one of web server 221, application server 222, and database server 223 shown in FIG. 2.

Policy target adapters 110(1), 110(2), ..., and 110(n) are responsible for managed network devices 112(1), 112(2), ..., and 112(n), respectively. Policy target adapters 110(1), 110(2), . . . , and 110(n) convert the set of coordinated security policies to firewall rule configurations of managed network devices 112(1), 112(2), . . . , and 112(n). The firewall rule configurations are settings that define firewall rules. Policy target adapters 110(1), 110(2), . . . , and 110(n) translates a common security policy into a form that is understood by respective managed network devices 112(1), 112(2), . . . , and 112(n).

Figure 2:
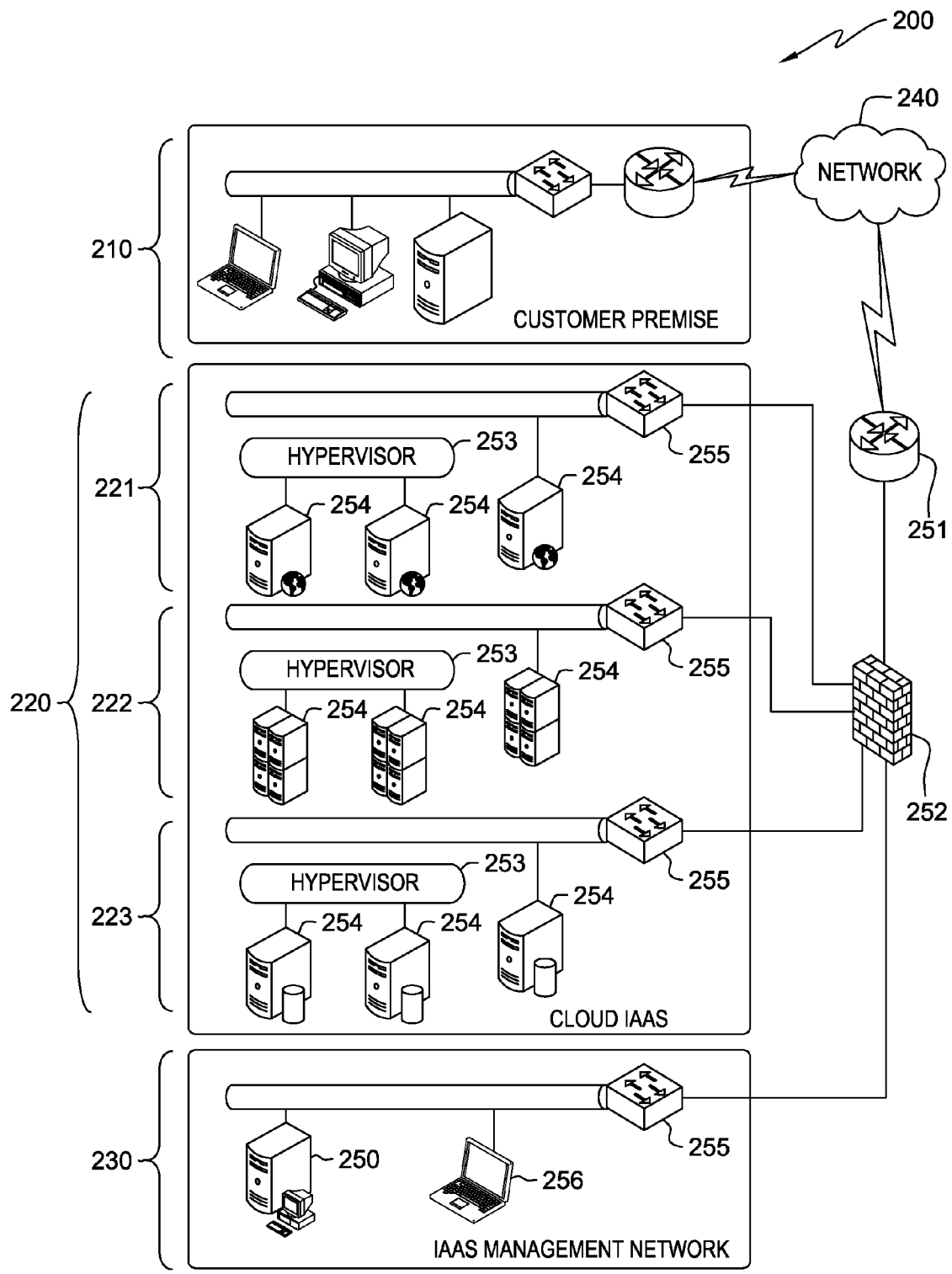
FIG. 2 is a diagram illustrating an exemplary infrastructure of a network, in accordance with an exemplary embodiment of the present invention.

FIG. 2 is a diagram illustrating exemplary infrastructure 200 of a network, in accordance with an exemplary embodiment of the present invention. The coordinated management of network security controls is implemented on infrastructure 200. Exemplary infrastructure 200 comprises cloud based infrastructure as a service (IaaS) 220, IaaS management network 230, and customer premise 210. In the exemplary embodiment, customer premise 210 is a customer's network connecting to the service provided by web server 221, application server 222, and database server 223.

Customer premise 210 connects to cloud based IaaS 220 through network 240. In the exemplary embodiment, network 240 is the Internet which represents a worldwide collection of networks and gateways to support communications between devices connected to the Internet. For example, network 240 may include wired, wireless, or fiber optic connections. In other embodiments, network 240 may be implemented as an intranet, a local area network (LAN), or a wide area network (WAN). In general, network 240 can be any combination of connections and protocols which support communications between customer premise 210 and cloud based IaaS 220.

Cloud based IaaS 220 is a typical setup of multiple virtual local area networks (VLANs). Cloud IaaS 220, in the exemplary embodiment, comprises web server 221, application server 222, and database server 223.

IaaS management network 230 comprises firewall management server 250 for implementing coordinated network security management. Firewall management server 250 includes security policy manager 104, policy impact calculator 106, network topology database 108, and policy target adapters 110(1), 110(2), . . . , and 110(n) shown in FIG. 1. Firewall management server 250 is a server that intelligently manages firewall rules and pushes them to various firewall technologies in an optimized and coordinated fashion. The various firewall technologies include various devices such as VPN router 251, traditional network firewall 252, hypervisor based firewall 253, server based firewall 254, router/switch access control lists (ACLs) 255, and workstation based firewall 256. Firewall management server 250 ensures firewall rules are granular enough for the various devices. Firewall management server 250 also ensures rules are in agreement with each other or there is no rule conflict. In the exemplary embodiment shown in FIG. 2, firewall management server 250 and cloud based IaaS 220 are on a same subnet. However, firewall management server 250 in other embodiments can be on a separate management subnet so that management traffic flows of firewall management server 250 are separated from production business traffic flows of cloud based IaaS 220.

Figure 3:
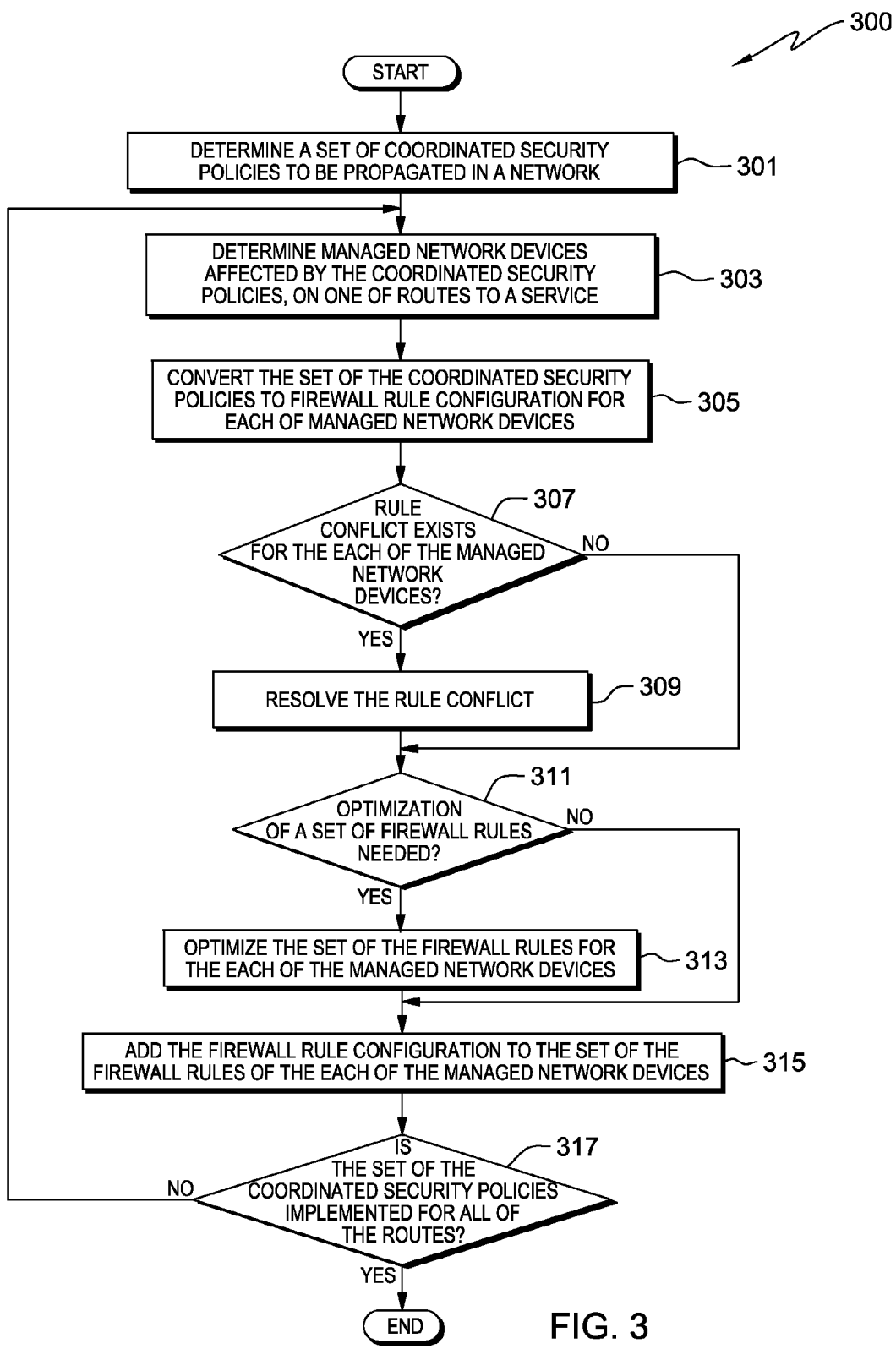
FIG. 3 is a flowchart illustrating operational steps for implementing coordinated management of network security controls, in accordance with an exemplary embodiment of the present invention.

FIG. 3 is flowchart 300 illustrating operational steps for implementing coordinated management of network security controls, in accordance with an exemplary embodiment of the present invention. In the exemplary embodiment, the operational steps for implementing coordinated management of network security controls are implemented by firewall management server 250 shown in FIG. 2.

At step 301, firewall management server 250 determines a set of coordinated security policies to be propagated in a network. In order to determine the set of the coordinated security policies, firewall management server 250 combines knowledge from network topology database 108 and network security policies defined on security policy manager 104. In the exemplary embodiment, policy impact calculator 106 on firewall management server 250 implements step 301.

At step 303, firewall management server 250 determines, on one of routes to a service, managed network devices affected by the set of the coordinated security policies. The service is, for example, web server 221, application server 222, or database server 223 shown in FIG. 2. In the exemplary embodiment, policy impact calculator 106 on firewall management server 250 implements step 303. In the network, there may be many routes, and each of the routes may have one or more of the managed network devices.

At step 305, firewall management server 250 converts the set of the coordinated security policies to firewall rule configuration for each of the managed network devices. One or more policy target adapters, such as 110(1), 110(2), . . . , and 110(n), on firewall management server 250 implement step 305. Respective managed network devices 112(1), 112(2), . . . , and 112(n) are various types of devices, for example, VPNrouter 251, traditional network firewall 252, hypervisor based firewall 253, server based firewall 254, router/switch access control lists (ACLs) 255, and workstation based firewall 256. How to implement the coordinated security policies is per device type. Therefore, policy target adapters 110(1), 110(2), . . . , and 110(n) on firewall management server 250 translates the common security policies into forms that are understood by respective managed network devices 112(1), 112(2), . . . , and 112(n).

At decision step 307, policy impact calculator 106 on firewall management server 250 determines whether a rule conflict exists for the each of the managed network devices. The rule conflict exists when different rules have overlapping and competing effect in a specific one of the managed network devices. In response to determining that the rule conflict exists (YES branch of decision step 307), policy impact calculator 106 on firewall management server 250 resolves, at step 309, the rule conflict. For example, the rule conflict is resolved through re-arranging the order of rules in the firewall rule configuration. In the exemplary embodiment, policy impact calculator 106 resolves the rule conflict automatically. In other embodiments, policy impact calculator 106 may notify administrator 102 of the rule conflict.

In response to determining that the rule conflict does not exist (NO branch of decision step 307) or after step 309, policy impact calculator 106 in firewall management server 250 determines, at decision step 311, whether optimization of a set of firewall rules is needed for the each of the managed network devices. The optimization of the set of the firewall rules is an optional step of policy impact calculator 106. The optimization can be performed either by policy impact calculator 106 or manually by administrator 102. If the optimization is performed by policy impact calculator 106, the optimization is needed as a step of policy impact calculator 106. If the optimization is performed manually by administrator 102, the optimization is not needed as a step of policy impact calculator 106. In response to determining that the optimization is needed (YES branch of decision step 311), at step 313, policy impact calculator 106 on firewall management server 250 optimizes the set of the firewall rules for the each of managed network devices on the one of the routes. For example, policy impact calculator 106 optimizes the set of the firewall rules by combining multiple rules into a single representation of the ruleset. The single representation of the ruleset is more efficient and has the same end effect as the multiple rules.

In response to determining that the optimization is not needed (NO branch of decision step 311) or after step 313, policy impact calculator 106 in firewall management server 250, at step 315, adds the firewall rule configuration to the set of the firewall rules for the each of the managed network devices on the one of the routes.

At decision step 317, policy impact calculator 106 on firewall management server 250 determines whether the set of coordinated security policies is implemented for all of the routes. In response to determining the set of coordinated security policies is implemented for less than all the routes (NO branch of decision step 317), policy impact calculator 106 on firewall management server 250 reiterates steps from 303 to 317, until the implementation is done for all of the routes. In response to determining that the set of coordinated security policies is implemented for all of the routes (YES branch of decision step 317), policy impact calculator 106 terminates the operation.

Figure 4:
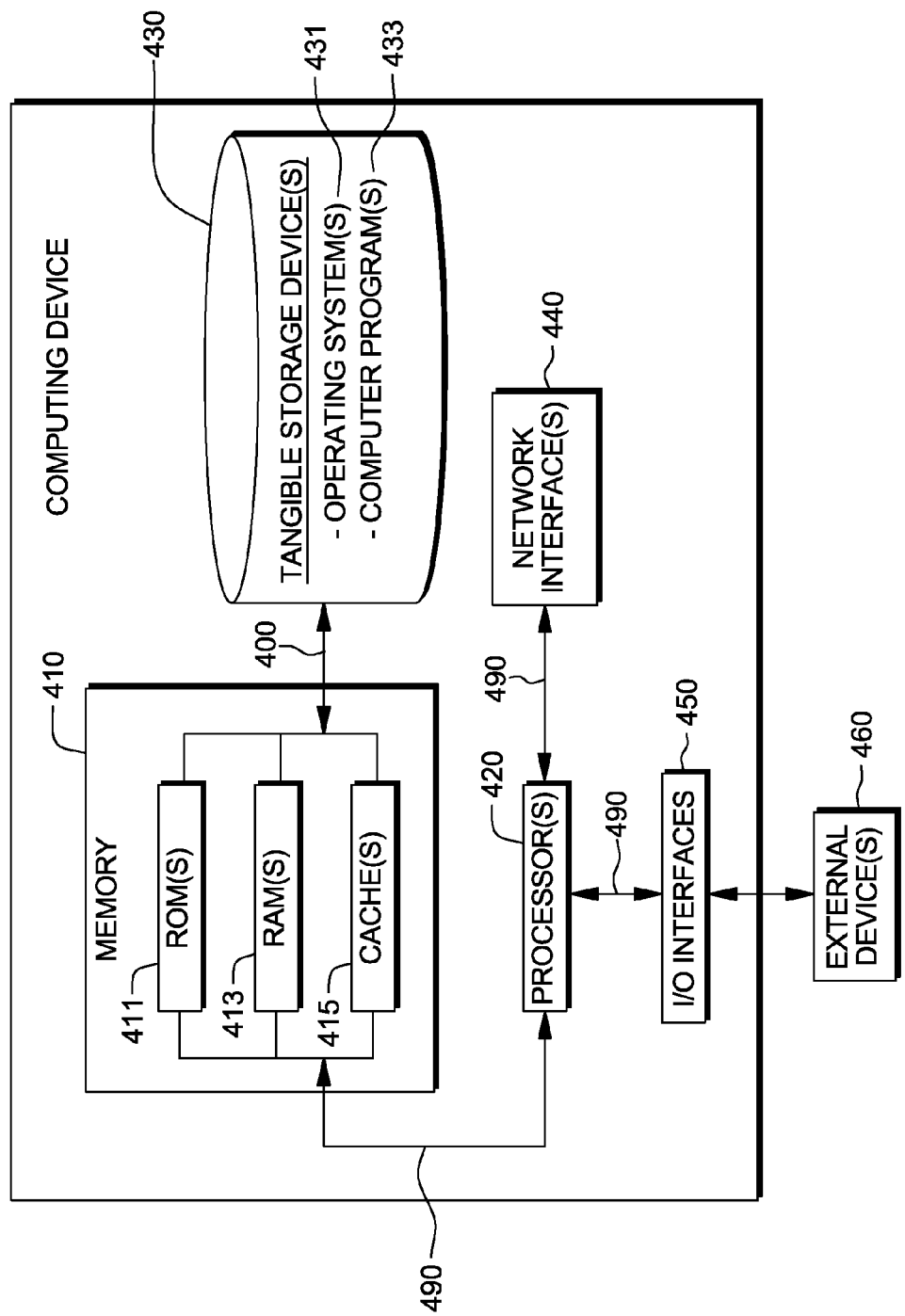
FIG. 4 is a diagram illustrating components of a computing device hosting the exemplary system shown in FIG. 1 for implementing coordinated management of network security controls, in accordance with an exemplary embodiment of the present invention.

FIG. 4 a diagram illustrating components of a computing device hosting firewall management server 250 (shown in FIG. 2) for implementing coordinated management of network security controls, in accordance with an exemplary embodiment of the present invention. It should be appreciated that FIG. 4 provides only an illustration of one implementation and does not imply any limitations with regard to the environment in which different embodiments may be implemented.

Referring to FIG. 4, the computing device includes processor(s) 420, memory 410, tangible storage device(s) 430, network interface(s) 440, and I/O (input/output) interface(s) 450. In FIG. 4, communications among the above-mentioned components of the computing device are denoted by numeral 490. Memory 410 includes ROM(s) (Read Only Memory) 411, RAM(s) (Random Access Memory) 413, and cache(s) 415.

One or more operating systems 431 and one or more computer programs 433 reside on one or more computer-readable tangible storage devices 430. In the exemplary embodiment, on the computing device hosting firewall management server 250, policy impact calculator 106, network topology database 108, and policy target adapters 110(1), 110(2), . . . , and 110(n) (all shown in FIG. 1) reside on one or more computer-readable tangible storage devices 430. In other embodiments, policy impact calculator 106, network topology database 108, policy target adapters 110(1), 110(2), . . . , and 110(n), and managed network devices 112(1), 112(2), . . . , and 112(n) reside respectively on multiple computer devices which are connected by a network.

The computing device further includes I/O interface(s) 450. I/O interface(s) 450 allow for input and output of data with external device(s) 460 that may be connected to the computing device. The computing device further includes network interface(s) 440 for communications between the computing device and a computer network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, and micro-code) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. The term of "computer readable storage medium" or "one or more computer-readable tangible storage devices", as used in this document, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Program code embodied on a computer readable medium may be transmitted using any appropriate medium, including but not limited to wireless, wireline, optical fiber cable, RF (radio frequency), and any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for implementing coordinated management of network security controls, the method comprising:
   determining, by a firewall management server in an Infrastructure as a Service (IaaS) management network, a plurality of managed network devices affected by a set of coordinated security policies, wherein the plurality of managed network devices are on routes to at least one of a web server, an application server, and a database server on a cloud based Infrastructure as a Service (IaaS) network, wherein the managed network devices are determined by calculating impact of the set of coordinated security policies based on a network topology;
   converting, by the firewall management server, the set of the coordinated security policies to a firewall rule configuration for each of the plurality of the managed network devices;
   adding, by the firewall management server, the firewall rule configuration to a set of firewall rules for the each of the plurality of the managed network devices; and
   wherein the firewall management server in the IaaS management network comprises a first program executable to provide an interface for a system administrator to view and manage the network security policies, a second program executable to implement the coordinated management of the network security controls, a plurality of the third programs responsible for respective ones of the plurality of the managed network devices and executable to translate the set of the coordinated security policies into the firewall rule configuration, and a database of the network topology.

2. The computer-implemented method of claim 1, further comprising the steps of:
   determining, by the firewall management server, whether a rule conflict in the set of the firewall rules exists; and
   resolving, by the firewall management server, the rule conflict.

3. The computer-implemented method of claim 1, further comprising the step of: optimizing, by the firewall management server, the set of firewall rules.

4. The computer-implemented method of claim 1, wherein the plurality of the managed network devices are at least one of: one or more virtual private network routers, one or more network firewalls, one or more hypervisor based firewalls, one or more server based firewalls, one or more router or switch access control lists, and one or more workstation based firewalls.

5. A computer program product for implementing coordinated management of network security controls, the computer program product comprising a computer readable storage medium having program code embodied therewith, the program code executable to:
   determine, by a firewall management server in an Infrastructure as a Service (IaaS) management network, a plurality of managed network devices affected by a set of coordinated security policies, wherein the plurality of managed network devices are on routes to at least one of a web server, an application server, and a database server on a cloud based Infrastructure as a Service (IaaS) network, wherein the managed network devices are determined by calculating impact of the set of coordinated security policies based on a network topology;
   convert, by the firewall management server, the set of the coordinated security policies to a firewall rule configuration for each of the plurality of the managed network devices;
   add, by the firewall management server, the firewall rule configuration to a set of firewall rules for each of the plurality of the managed network devices; and
   wherein the firewall management server in the IaaS management network comprises a first program executable to provide an interface for a system administrator to view and manage the network security policies, a second program executable to implement the coordinated management of the network security controls, a plurality of the third programs responsible for respective ones of the plurality of the managed network devices and executable to translate the set of the coordinated security policies into the firewall rule configuration, and a database of the network topology.

6. The computer program product of claim 5, the computer program product further comprising the program code executable to:
   determine, by the firewall management server, whether a rule conflict in the set of the firewall rules exists; and
   resolve, by the firewall management server, the rule conflict.

7. The computer program product of claim 5, the computer program product further comprising the program code executable to: optimize, by the firewall management server, the set of firewall rules.

8. The computer program product of claim 5, wherein the plurality of the managed network devices are at least one of: one or more virtual private network routers, one or more network firewalls, one or more hypervisor based firewalls, one or more server based firewalls, one or more router or switch access control lists, and one or more workstation based firewalls.

9. A computer system for implementing coordinated management of network security controls, the computer system comprising:
one or more processors, one or more computer-readable tangible storage devices, and program instructions stored on at least one of the one or more computer-readable tangible storage devices for execution by at least one of the one or more processors, the program instructions executable to:
determine, by a firewall management server in an Infrastructure as a Service (IaaS) management network, a plurality of managed network devices affected by a set of coordinated security policies, wherein the plurality of managed network devices are on routes to at least one of a web server, an application server, and a database server on a cloud based Infrastructure as a Service (IaaS) network, wherein the managed network devices are determined by calculating impact of the set of coordinated security policies based on a network topology;
convert, by the firewall management server, the set of the coordinated security policies to a firewall rule configuration for each of the plurality of the managed network devices;
add, by the firewall management server, the firewall rule configuration to a set of firewall rules for each of the plurality of the managed network devices; and
wherein the firewall management server in the IaaS management network comprises a first program executable to provide an interface for a system administrator to view and manage the network security policies, a second program executable to implement the coordinated management of the network security controls, a plurality of the third programs responsible for respective ones of the plurality of the managed network devices and executable to translate the set of the coordinated security policies into the firewall rule configuration, and a database of the network topology.

10. The computer system of claim 9, further comprising program instructions executable to:
determine, by the firewall management server, whether a rule conflict in the set of the firewall rules exists; and
resolve, by the firewall management server, the rule conflict.

11. The computer system of claim 9, further comprising program instructions executable to: optimize, by the firewall management server, the set of firewall rules.

12. The computer system of claim 9, wherein the plurality of the managed network devices are at least one of: one or more virtual private network routers, one or more network firewalls, one or more hypervisor based firewalls, one or more server based firewalls, one or more router or switch access control lists, and one or more workstation based firewalls.

* * * * *